United States Patent [19]

Millar et al.

[11] 3,971,405
[45] July 27, 1976

[54] PRESSURE CONTROLLED HYDRANT VALVE COUPLER

[75] Inventors: James S. Millar, Fountain Valley; Douglas R. Garrett, Los Angeles, both of Calif.

[73] Assignee: Parker-Hannifin Corporation, Cleveland, Ohio

[22] Filed: July 15, 1974

[21] Appl. No.: 488,392

[52] U.S. Cl. .............................. 137/489; 137/461; 137/487; 137/614
[51] Int. Cl.[2] ..................... F16K 31/12; F16K 11/10
[58] Field of Search ............... 137/459, 484.6, 486, 137/461, 487, 489.5, 491, 625.66, 614, 489

[56] References Cited
UNITED STATES PATENTS

| | | | |
|---|---|---|---|
| 3,298,390 | 1/1967 | de Graaf | 137/459 |
| 3,351,094 | 11/1967 | Elbogen et al. | 137/625.66 |

OTHER PUBLICATIONS
Advertisement, p. 52, Aviation Week, Apr. 27, 1970, Apco.
Specification of the above located in article: "Forward Area Refueling Systems for Army Aircraft," Nov. 5, 1969 by N. A. Caspero.

*Primary Examiner*—Martin P. Schwadron
*Assistant Examiner*—H. Jay Spiegel
*Attorney, Agent, or Firm*—Donnelly, Maky, Renner & Otto

[57] ABSTRACT

A pressure controlled hydrant valve coupler characterized in that the main pilot operated pressure control valve and the excess flow servo valve are embodied in the coupler housing. The coupler herein is further characterized in that the pilot operated pressure control valve has associated therewith a fast closing valve and a surge control valve.

7 Claims, 1 Drawing Figure

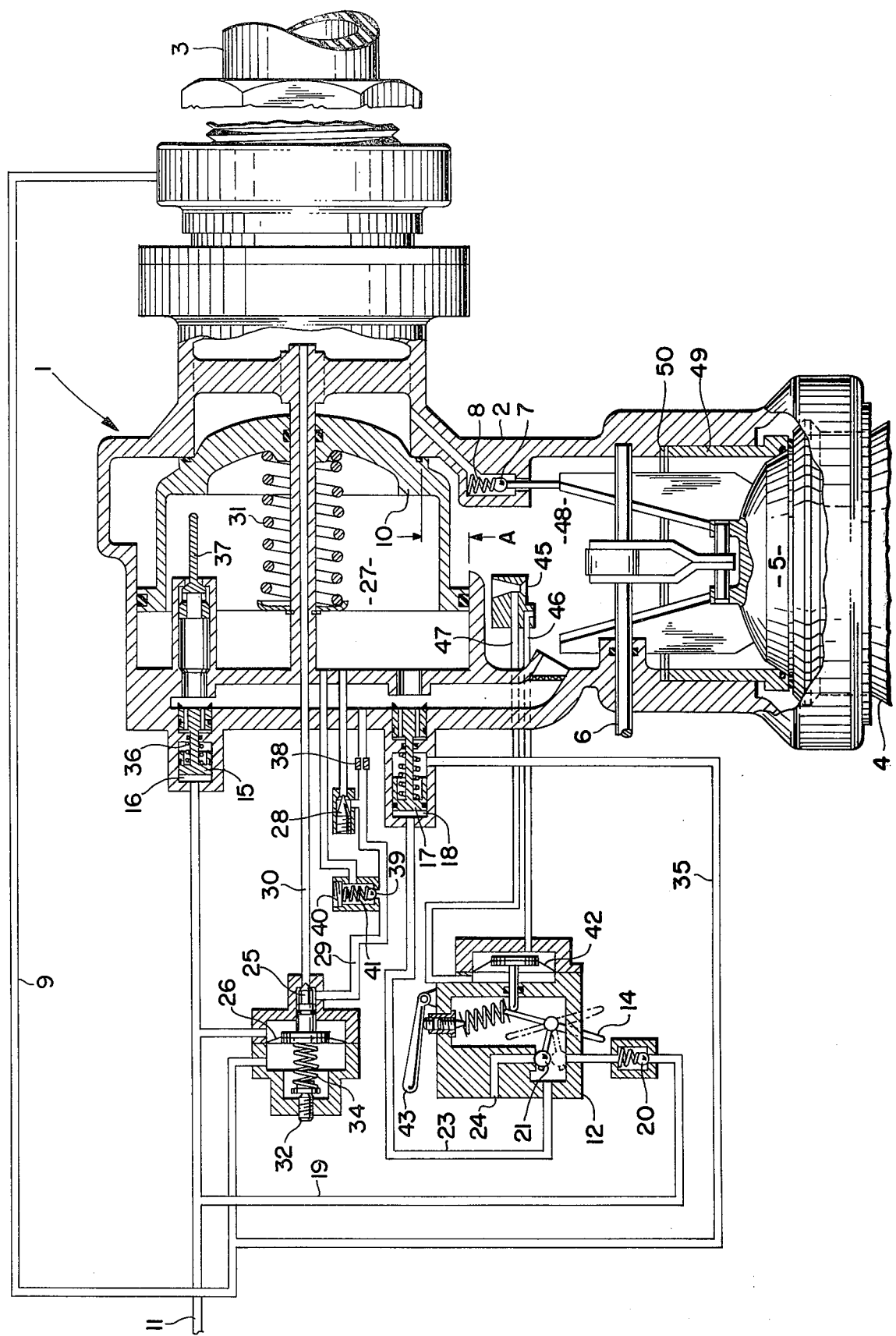

PRESSURE CONTROLLED HYDRANT VALVE COUPLER

BACKGROUND OF THE INVENTION

In the refueling of aircraft fuel tanks, for example, it is one common practice to couple the ends of a fuel supply line to an aircraft fuel tank and to a hydrant valve. In such system, when the fuel line coupler is coupled to the hydrant valve, the opening of the coupler valve simultaneously opens the hydrant valve for flow of fuel under pressure from an underground storage tank through the fuel supply line into the aircraft fuel tank. In known systems of this character as disclosed, for example, in the U.S. Pat. Nos. 3,221,764; 3,286,725; 3,298,390; and 3,351,094, the pressure control valves or regulators are embodied in the hydrant valve unit and hence must be duplicated in each installation at substantial cost.

SUMMARY OF THE INVENTION

In contradistinction to the foregoing the pressure control components are embodied in the hydrant valve coupler to avoid duplication thereof in each hydrant valve thus to effect substantial economies.

It is a principal object of this invention to provide a pressure controlled hydrant valve coupler in which the pilot valve for the excess flow servo further constitutes a surge control valve.

It is another object of this invention to provide in association with the pilot operated pressure control valve, a fast closing valve which, when opened as by venting of reference air pressure therefrom and from the pressure control pilot valve, enables rapid movement of the pressure control valve toward seated position followed by deceleration during the terminal portion of the closing stroke of the pressure control valve and which, when closed, as by conducting reference air pressure thereto, enables speed control means in the pilot circuit to control the closing and opening times of the pressure control valve.

Other objects and advantages will appear from the ensuing description.

BRIEF DESCRIPTION OF THE DRAWING

The single FIGURE schematically illustrates a preferred form of pressure controlled hydrant valve coupler embodying the present invention.

DETAILED DESCRIPTION OF THE DRAWING

The pressure controlled hydrant valve coupler 1 herein shown comprises an angular housing 2 to one end of which a flexible fuel hose 3 is adapted to be connected. As well known in the art, the coupler 1, the fuel hose 3, and a reel onto which and from which the hose 3 is wound and unwound are mounted on a cart as is a hose which has the fueling nozzle adapted for detachable connection to the fueling port of the aircraft fuel tank. The other end of the coupler housing 2 is adapted to be coupled in well known manner to the upper end of a hydrant valve 4 and when the poppet valve 5 in the coupler housing 2 is opened as by turning the shaft 6 the opening movement of the poppet valve 5 will effect opening movement of a check valve at the upper end of the hydrant valve 4. When the poppet valve 5 is thus moved to open position, the relief valve member 7 is urged to seated position by the spring 8.

The coupler housing 2 has a fuel sensing passage 9 leading to the downstream side of the main pressure control valve member 10 and has an air passage 11 for reference air pressure from a regulated air pressure source controlled as by a "dead man" valve. When the coupler housing 2 is coupled to the hydrant valve 4, the excess flow servo valve 12 is positioned in the solid line position by a manually operated handle 14. When reference air pressure is supplied to the air passage 11, the fast closing valve 15 is closed by air pressure in chamber 16 thereof, the surge control and excess flow pilot valve 17 is closed by air pressure in the chamber 18 thereof via the passage 19, the check valve 20, the excess flow servo valve member 21 which opens communication from the check valve 20 to the passage 23 and closes the vent passage 24, and the pressure control pilot valve 25 is opened by reason of the pressure differential between the reference air pressure and the downstream fuel pressure acting on opposite sides of the diaphragm 26 thereof. When the pilot valve 25 is open, the main valve chamber 27 is bled to the downstream side via the metering valve 28 which determines the opening time, the passage 29, the open pilot valve 25, and the passage 30 leading to the downstream side of the main pressure control valve 10. Accordingly, the fuel pressure acting on the annular area A of the main control valve 10 overcomes the now decreased pressure in the chamber 27 and the force of the spring 31 to cause the main pressure control valve 10 to move toward the left to permit flow of fuel through the coupler 1. As aforesaid, the time of opening of the main pressure control valve 10 is determined by the setting of the metering valve 28.

As the downstream pressure increases to a preset control pressure, the pressure control pilot valve 25 will move to a throttling position causing the main valve 10 to stabilize to maintain the preset pressure. For example, the set pressure may be say 16 or 25 psi less than the air reference pressure, and this set pressure is adjustable as by means of an adjusting screw 32 on the pressure control pilot valve which changes the setting of the spring 34 acting on the pilot valve 25 tending to move it toward a closed position.

A sudden rise of downstream pressure will cause the surge control pilot valve 17 to open due to the rise in fuel pressure in the passage 35 overcoming the reference air pressure acting on the other side thereof and, when said surge control pilot valve 17 is open upstream pressure is admitted into the chamber 27 to cause rapid closing of the main valve 10.

When the reference air pressure in the reference air passage 11 is released as by operation of the "dead man" valve aforesaid, the spring 36 of the fast closing valve 15 is effective to open said fast closing valve 15 and when the main valve 10 is in open position it also will have opened the check valve 37 so that upstream pressure is admitted into the main valve chamber 27. This causes the main pressure control valve 10 to move rapidly toward closed position until it disengages from the check valve 37. At this time, the upstream pressure flows into the enlarging chamber 27 via the orifice 38 and the check valve 39 which has a closing time adjustment screw 40 to adjust the spring 41 thereof to effect final closing movement of the main valve 10 at a desired rate.

In normal operation, the excess flow servo valve member 21 blocks the vent passage 24 and opens the air passage 23 to the surge control pilot valve 17 holding it closed as aforesaid. When a predetermined excess flow rate is reached, as determined by the pressure differential on opposite sides of the diaphragm 42, the valve member 21 is actuated to the phantom line position to release the reference air pressure in chamber 18 through passages 23 and 24 allowing the surge control valve 17 to open and to admit upstream pressure to the main valve chamber 27. This causes the main control valve 10 to close suddenly. The main valve 10 will remain closed until the valve member 21 is reset by the manual lever 14. The other lever 43 on the excess flow servo valve 12 is held by a detent in a high flow position after manual depression and the coupler handle releases the detent when the poppet valve 5 is closed before disconnect of the coupler 1 from the hydrant valve 4. The operation of the excess flow servo valve 12 is controlled as by a venturi 45 which gives the signal to operate the excess flow servo valve 12, high pressure being conducted through the passage 46 to act on one side of the diaphragm 42 and the reduced pressure at the venturi throat being conducted through passage 47 to act on the other side of the diaphragm 42.

As known in the art, the aircraft fuel tank will be provided with a level control valve and when the fuel level reaches a predetermined level in the aircraft fuel tank, the level control valve will be closed and of course this causes a pressure surge or rise in the fuel supply hose 3 downstream of the main pressure control valve 10. This increased downstream pressure sensed in the passage 9 causes opening of the surge control pilot valve 17 whereby upstream pressure is conducted into the main valve chamber 27 for causing rapid movement thereof toward closed position.

The coupler relief valve 7 is mechanically operated to open position upon closing of the coupler poppet valve 5 and provides a fluid path to the downstream side of the main valve 10 to relieve pressure locked up in the upstream chamber 48 upon closing of the coupler poppet valve 5 to permit additional upward motion of the poppet valve 5 and sleeve 49 after seating of the poppet valve thereagainst, there being a wave spring washer 50 or the like acting on said sleeve 49.

The embodiments of the invention in which an exclusive property or privilege is claimed are as follows:

1. In a pressure controlled valve assembly of the type wherein a valve housing has therein a pilot operated main pressure control valve which defines a pressure seating chamber with said housing having restricted communication with fluid pressure upstream of a seat in a valve housing passage and wherein said main valve is moved toward and away from said seat to control flow of fluid through said passage responsive to actuation of a pilot valve to bleed said chamber to the downstream side of said seat by pressure differential of a reference fluid pressure source and fluid pressure downstream of said seat acting on said pilot valve, the improvement which comprises a fast closing valve in said housing which is actuated by such reference fluid pressure independently of the magnitude of the downstream fluid pressure to close communication of said chamber with fluid pressure upstream of said seat and which, upon release of such reference fluid pressure acting thereon, opens communication of said chamber with fluid pressure upstream of said seat for rapid movement of said main pressure control valve toward said seat.

2. The valve assembly of claim 1 wherein the flow path of fluid from the upstream side of said seat into said chamber includes adjustable means to vary the rate of movement of said main pressure control valve toward said seat while said fast closing valve is in closed position.

3. The valve assembly of claim 1 wherein a surge control valve in said housing separate and apart from said fast closing valve is actuated by such reference fluid pressure to close communication of said chamber with fluid pressure upstream of said seat, said surge control valve being exposed to downstream fluid pressure and being actuated by buildup of downstream pressure above a predetermined value with respect to such reference fluid pressure to open communication between said upstream fluid pressure and said chamber to effect movement of said main valve toward said seat.

4. The valve assembly of claim 2 wherein said surge control valve upon release of reference fluid pressure therefrom is operative to open communication between fluid pressure upstream of said seat and said chamber.

5. The valve assembly of claim 4 wherein an excess flow servo valve in said housing responds to excess flow of fluid through said passage to release reference fluid pressure from said surge control valve to effect movement of said main pressure control valve into engagement with said seat to close said passage.

6. The valve assembly of claim 5 wherein said servo valve is manually operable to re-establish communication of said reference fluid pressure with said surge control valve for movement of said main pressure control valve with respect to said seat under the control of said pilot valve.

7. In a pressure controlled valve assembly of the type wherein a valve housing has therein a pilot operated main pressure control valve which defines a pressure seating chamber with said housing having restricted communication with fluid pressure upstream of a seat in a valve housing passage and wherein said main valve is moved toward and away from said seat to control flow of fluid through said passage responsive to actuation of a pilot valve to bleed said chamber to the downstream side of said seat by pressure differential of a reference fluid pressure source and fluid pressure downstream of said seat acting on said pilot valve, the improvement which comprises a fast closing valve in said housing which is actuated by such reference fluid pressure to close communication of said chamber with fluid pressure upstream of said seat and which, upon release of such reference fluid pressure acting thereon, opens communication of said chamber with fluid pressure upstream of said seat for rapid movement of said main pressure control valve toward said seat; and a check valve in the flow path through the open fast closing valve into said chamber; said main valve being engageable with said check valve to open the same after initial opening movement of said main valve and being disengageable from said check valve to permit closing of the same during the terminal portion of the closing movement of said main valve whereby, when said fast closing is open, the fast closing movement of said main valve is retarded by the closing of said flow path by disengagement of said main valve from said check valve.

* * * * *